United States Patent [19]

Yamakawa et al.

[11] Patent Number: 4,598,053

[45] Date of Patent: Jul. 1, 1986

[54] CERAMIC COMPACTS

[75] Inventors: Akira Yamakawa; Eiji Kamijo, both of Itami, Japan

[73] Assignee: Sumitomo Electric Industries, Ltd., Osaka, Japan

[21] Appl. No.: 706,166

[22] Filed: Feb. 27, 1985

[30] Foreign Application Priority Data

Feb. 27, 1984 [JP] Japan .................................. 58-36774

[51] Int. Cl.$^4$ ............................................. C04B 35/48
[52] U.S. Cl. .................................. 501/104; 501/103; 501/87; 501/96; 501/152; 51/309
[58] Field of Search ................... 501/87, 96, 103, 104; 51/309

[56] References Cited

U.S. PATENT DOCUMENTS

| | | | |
|---|---|---|---|
| 3,740,340 | 6/1973 | Riley et al. | 252/301.1 R |
| 4,366,254 | 12/1982 | Rich et al. | 51/309 X |

FOREIGN PATENT DOCUMENTS

| | | | |
|---|---|---|---|
| 0023611 | 2/1979 | Japan | 501/87 |
| 140762 | 11/1980 | Japan | |
| 0140370 | 8/1982 | Japan | 501/87 |
| 0032067 | 2/1983 | Japan | 501/96 |
| 120571 | 7/1983 | Japan | |
| 0181766 | 10/1983 | Japan | 501/87 |

OTHER PUBLICATIONS

Mitsubishi Metal, Chem. Abstracts 100:90292g, 1984.

Primary Examiner—William R. Dixon, Jr.
Assistant Examiner—Karl Group
Attorney, Agent, or Firm—Wenderoth, Lind & Ponack

[57] ABSTRACT

A ceramic compact having a high transverse rupture strength is provided by a low cost sintering method. This ceramic compact comprises 55 to 96% by volume of a first component, 4 to 45% by volume of a second component and at most 3% by volume of unavoidable impurities:

First Component: $ZrO_2$ consisting of at least 80% by weight of at least one of tetragonal system and cubic system and the balance of mono-clinic system, in which at least one member selected from the group consisting of oxides of Group IIIa (Including Sc, Y, La) elements of the Periodic Table, CaO, MgO, and mixtures thereof are dissolved to form a solid solution.

Second Component: at least one member selected from the group consisting of carbonitrides, oxycarbides, oxynitrides and carboxynitrides of group IVa (Including Ti, Zr, Hf), Va (Including V, Nb, Ta) and VIa (Including Cr, Mo, W) elements of the Periodic Table, and mixtures or solid solutions thereof.

4 Claims, No Drawings

CERAMIC COMPACTS

BACKGROUND OF THE INVENTION

1. Field of the Invention

This invention relates to a high strength ceramic compact or sintered body and more particularly, it is concerned with a ceramic compact comprising tetragonal and/or cubic $ZrO_2$ as a predominant component.

2. Description of the Prior Art

Sintered ceramic materials having excellent properties such as high hardness, high temperature strength and chemical stability have lately been studied and developed as a structural material. However, their practical use has considerably been limited because of various problems about strength, stability of strength, toughness, etc.

In order to meet with the requirement for the strength and toughness, tetragonal $ZrO_2$ type compacts or tetragonal $ZrO_2$-dispersed type and partially stabilized $ZrO_2$ type compacts have been developed, having a transverse rupture strength of 110 kg/mm$^2$ (Japanese Patent Application OPI (Kokai) No. 140762/1980). In order to further improve the hardness, wear resistance and transverse rupture strength of these compacts, there have been proposed, for example, compacts consisting of $ZrO_2$ and one or more of borides, carbides and nitrides of Al, Si, Group IVa, Va, and VIa elements of the Periodic Table and $Al_2O_3$ (Japanese Patent Application OPI (Kokai) No. 120571/1983). In this case, the transverse rupture strength amounts to 160 kg/mm$^2$, but sintering cannot be performed well and an expensive sintering method using a hot press is required. Furthermore, of course, a sintered compact with a higher transverse rupture strength is required.

SUMMARY OF THE INVENTION

It is an object of the present invention to provide a novel ceramic compact whereby the above described requirements can be satisfied.

It is another object of the present invention to provide a high strength ceramic compact comprising tetragonal and/or cubic $ZrO_2$ as a main component.

These objects can be attained by a ceramic sintered compact comprising a first component consisting of $ZrO_2$ as a predominant component in which a predetermined amount of a stabilizer selected from oxides of Group IIIa (Including Sc, Y, La) elements of the Periodic Table, CaO and MgO and mixtures thereof is dissolved to form a solid solution, and a second component consisting of one or more of carbonitrides, oxycarbides, oxynitrides and carboxynitrides of Group IVa (Including Ti, Zr, Hf), Va (Including V, Nb, Ta) and VIa (Including Cr, Mo, W) elements of the Periodic Table.

DETAILED DESCRIPTION OF THE INVENTION

The inventors have made various efforts to obtain a ceramic compact having a higher hardness and transverse rupture strength by a low cost sintering method and have reached the present invention. That is, the present invention provides a ceramic compact comprising tetragonal and/or cubic $ZrO_2$ as a predominant component, in particular, comprising 55 to 96% by volume of a first component, 4 to 45% by volume of a second component and at most 3% by volume of unavoidable impurities:

First Component: $ZrO_2$ consisting of 80% by weight or more of tetragonal and/or cubic system and the balance of monoclinic system, in which one or more members selected from the group consisting of oxides of Group IIIa (Including Sc, y, La) elements of the Periodic Table, CaO, MgO, and mixtures thereof are dissolved to form a solid solution.

Second Component: one or more members selected from the group consisting of carbonitrides, oxycarbides, oxynitrides and carboxynitrides of Group IVa (Including Ti, Zr, Hf), Va (Including V, Nb, Ta) and VIa (Including Cr, Mo, W) elements of the Periodic Table, and mixtures or solid solutions thereof.

As to the First Component, $ZrO_2$ phase is in a proportion of 55 to 96% by volume to the sintered compact, since if less than 55% by volume, the strength of the compact is insufficient, while if more than 96% by volume, the hardness and strength of the compact are lowered. Furthermore, $ZrO_2$ phase consists of 80% by weight or more of tetragonal and/or cubic system, since if the proportion of monoclinic system is increased, the strength is lowered. According to the present invention, it is found that if the amount of monoclinic system is not greater than 20% by weight, excellent strength can be maintained.

Impurities incorporated in raw materials or during the process should be in a proportion of at most 3% by volume to keep the strength sufficient.

For the purpose of keeping $ZrO_2$ phase tetragonal or cubic, it is necessary to dissolve therein a predetermined amount of a stabilizer selected from the group consisting of oxides of the Group IIIa elements, CaO, MgO, and mixtures thereof to form a solid solution. The predetermined amount specified herein means ⅓ to 1/1 of the amount capable of keeping the cubic system stable up to the minimum temperature shown in the constitutional diagram. When the stabilizer is $Y_2O_3$, the predetermined amount is 2.5 to 7.5 mol %.

As to the Second Component, the use of Ti compounds for a substrate for a thin film magnetic head is preferably avoided, since the Ti compounds particularly have a higher hardness which is considerably different from the $ZrO_2$ phase, such that the surface tends to be roughened during mirror surface grinding. Moreover, when using a carbide or nitride alone, sintering is difficult, and even their mixtures do not have such an improved sintering property. Only the use of substitution solid solutions such as carbonitrides, oxycarboxide, oxynitrides and carboxynitrides results in high strength compacts. In particular, it is effective so as to improve the properties of the compact to use a solid solution represented by the general formula,

$$M(C_lN_mO_n)_z$$

wherein M is at least one of the Group IVa, Va and VIa elements, $l+m+n=1$, $l+m\neq0$, $m+n\neq0$, $l+n\neq0$ and $1.2>z>0.5$.

Preparation of the compact or sintered body of the present invention can be carried out in a conventional manner, for example, by mixing starting powders and subjecting the mixture to hot press or to compacting followed by sintering at the atmospheric pressure. Furthermore, it is found that a subsequent hot hydraulic press is very effective for obtaining a precise compact.

The following examples are given in order to illustrate the present invention in detail without limiting the same.

EXAMPLE 1

$ZrO_2$ prepared by a coprecipitation method, containing 3 mols of $Y_2O_3$ was mixed with the Second Component having the composition shown in Table 1 and then hot pressed in vacuum at 1500° C. and 300 kg/cm$^2$ for 2 hours. The mixing was carried out using a density of 6.05 for $ZrO_2$ and a known density for the Second Component to calculate the weight ratio. The resulting compact was subjected to grinding and then to X-ray diffraction to obtain the amounts of tetragonal system and cubic system by the following calculation formula:

$$\text{Volume Ratio of (tetragonal + cubic)} = \frac{\text{tetragonal(111)} + \text{cubic(111)}}{\text{monoclinic(111)} + \text{monoclinic(111)} + \text{tetragonal(111)} + \text{cubic(111)}}$$

The hardness and transverse rupture strength (TRS) were measured by the methods according to HRA and JIS.

It will clearly be understood from the results as shown in Table 1 that a markedly high strength can be given when the Second Component is in a proportion of 4 to 45% by volume and consists of carbonitrides, oxycarbides, oxynitrides and carboxynitrides of Group IVa, Va and VIa elements or solid solution thereof.

TABLE 1

| Sample No. | Second Component Composition | Amount (vol %) | Tetragonal + Cubic (vol %) | Hardness HRA | Transverse Rupture Strength MPa |
|---|---|---|---|---|---|
| 1 | $Ti_{0.7}N_{0.3}$ | 15 | 85 | 92.0 | 160 |
| 2 | $Ti_{0.7}N_{0.3}$ | 35 | 85 | 93.0 | 170 |
| 3 | $Ti_{0.5}O_{0.5}$ | 25 | 90 | 92.5 | 170 |
| 4 | $ZrC_{0.5}N_{0.5}$ | 25 | 90 | 92.0 | 165 |
| 5 | $NbC_{0.7}N_{0.3}$ | 25 | 90 | 92.0 | 170 |
| 6 | $Ti_{0.5}W_{0.5}C_{0.9}N_{0.1}$ | 25 | 90 | 92.5 | 170 |
| 7 | $TiN_{0.5}O_{0.5}$ | 25 | 90 | 92.5 | 165 |
| 8 | $TiC_{0.5}N_{0.3}O_{0.2}$ | 25 | 90 | 92.5 | 160 |
| 9* | $TiC_{0.7}N_{0.3}$ | 50 | 70 | 91.5 | 80 |
| 10* | $TiC_{0.7}N_{0.3}$ | 2 | 90 | 91.2 | 110 |
| 11* | TiC | 25 | 85 | 91.5 | 110 |
| 12* | TiN | 25 | 80 | 91.5 | 110 |
| 13* | TiC TiN | 12.5 | 85 | 91.5 | 140 |
| 14* | — | — | 90 | 91.0 | 120 |

Note: *Comparative Sample

EXAMPLE 2

A $ZrO_2$ powder having a composition shown in Table 2 was mixed with $TiC_{0.7}N_{0.3}$ to give a proportion of 25% by volume of the sintered compact, sintered and then subjected to assessment of the crystalline form of $ZrO_2$, HRA and TRS in an analogous manner to Example 1 thus obtaining results shown in Table 2. Depending upon the variety of stabilizer, it is required sometimes that at least 80% by weight of the $ZrO_2$ crystals are of tetragonal system and cubic system.

TABLE 2

| Sample No. | Stabilizer Composition | Amount (mol %) | Tetragonal + Cubic (vol %) | Hardness HRA | Transverse Rupture Strength MPa |
|---|---|---|---|---|---|
| 21 | $Y_2O_3$ | 3 | 90 | 92.5 | 170 |
| 22 | $Y_2O_3$ | 5 | 95 | 92.5 | 130 |
| 23 | CaO | 7 | 95 | 92.5 | 130 |
| 24* | $Y_2O_3$ | 1 | 30 | 92.0 | 60 |
| 25* | $Y_2O_3$ | 0 | 0 | not compacted | |

Note: *Comparative Sample

EXAMPLE 3

When the sintered compacts obtained in Example 1 were subjected to polishing using diamond paste, the compacts containing the Ti compounds as Second Component each had a surface roughness of at least 0.03 μm but the others (Sample Nos. 4 and 5 in Table 1) showed a surface roughness of at most 0.01 μm. This is considered due to the fact that the Ti compounds have a larger hardness that is largely different from that of the $ZrO_2$ phase.

The compact of excellent surface roughness which can readily be obtained by the present invention is useful for thin film magnetic heads. When the compact of Sample No. 4 in Table 1 was worked into a substrate for a thin film magnetic head, the compact was excellent in machinability and the resulting substrate was favourably compared in performances as such with the commonly used $Al_2O_3$-TiC ceramics. That is, according to the present invention, there can be provided excellent ceramic substrate materials for magnetic thin film heads.

EXAMPLE 4

The mixed powders with the compositions of Table 1 were prepared in the similar manner to Example 1, subjected to a hydrostatic press at a pressure of 2 t/cm$^2$ and sintered in vacuum at 1600° C. Further, the resulting compacts were subjected to a hot hydrostatic press at 1600° C. and 1000 atm in Ar gas. The properties of the compacts are shown in Table 3:

TABLE 3

| Sample No. | Second Component Composition | Amount (vol %) | Tetragonal + Cubic (vol %) | Hardness HRA | Density (g/cm$^3$) | Transverse Rupture Strength MPa |
|---|---|---|---|---|---|---|
| 41 | $TiC_{0.7}N_{0.3}$ | 15 | 85 | 99.5 | 92.0 | 160 |

TABLE 3-continued

| Sample No. | Second Component Composition | Amount (vol %) | Tetragonal + Cubic (vol %) | Hardness HRA | Density (g/cm³) | Transverse Rupture Strength MPa |
|---|---|---|---|---|---|---|
| 42 | TiC$_{0.7}$N$_{0.3}$ | 35 | 85 | 99.0 | 93.0 | 160 |
| 43 | TiC$_{0.5}$O$_{0.5}$ | 25 | 90 | 99.5 | 92.5 | 160 |
| 44 | ZrC$_{0.5}$N$_{0.5}$ | 25 | 90 | 99.5 | 92.0 | 160 |
| 45 | NbC$_{0.7}$N$_{0.3}$ | 25 | 90 | 99.5 | 92.0 | 160 |
| 46 | Ti$_{0.5}$W$_{0.5}$C$_{0.9}$N$_{0.1}$ | 25 | 90 | 99.5 | 92.5 | 160 |
| 47 | TiN$_{0.5}$O$_{0.5}$ | 25 | 90 | 99.5 | 92.5 | 160 |
| 48 | TiC$_{0.5}$N$_{0.3}$O$_{0.2}$ | 25 | 90 | 99.5 | 92.5 | 160 |
| 49* | TiC$_{0.7}$N$_{0.3}$ | 50 | 70 | 98 | 91.0 | 70 |
| 50* | TiC$_{0.7}$N$_{0.3}$ | 2 | 90 | 99.5 | 91.0 | 100 |
| 51* | TiC | 25 | 85 | 98 | 90.5 | 80 |
| 52* | TiN | 25 | 80 | 98 | 90.5 | 80 |
| 53* | TiC TiN | 12.5 | 85 | 99 | 90.5 | 100 |
| 54* | — | — | 90 | 99.5 | 91.0 | 100 |

Note: *Comparative Sample

EXAMPLE 5

A slitter for a magnetic tape, having a dimension of 120 mm × 50 mm × 2 mm (holed disk) was made in an analogous manner to Example 1, Sample No. 1 of Table 1 and subjected to assessment of edge breakage after grinding and cutting performance. The slitter of the present invention exhibited a better cutting performance or sharpness without breakage, compared to of the commonly used fine grain cemented carbides. In addition, the wear resistance of the slitter of the present invention was at least two times that of the cemented carbides of the prior art.

On the other hand, a comparative slitter made of tetragonal ZrO$_2$ only was inferior in cutting performance to that of the cemented carbides of the prior art because of edge breakage.

As is evident from these results, the composition of the present invention is excellent, in particular, in the use of a sintering method without a hot press. That is, the present invention is useful in that the mass production of a compact having a complicated shape is made possible with a low cost.

According to the present invention, as set forth above, there can be obtained ceramic compacts with a high transverse rupture strength by a low cost sintering method.

What is claimed is:

1. A ceramic compact consisting essentially of 55 to 96% by volume of a first component, 4 to 45% by volume of a second component and at most 3% by volume of unavoidable impurities:

First Component: ZrO$_2$ consisting of at least 80% by weight of at least one of tetragonal system and cubic system and the balance of monoclinic system, in which at least one member selected from the group consisting of oxides of Group IIIa elements of the Periodic Table, CaO, MgO, and mixtures thereof are dissolved to form a solid solution, Second Component: at least one member selected from the group consisting of carbonitrides, oxycarbides, oxynitrides and carboxynitrides of Group IVa, Va and VIa elements of the Periodic Table, and mixtures or solid solutions thereof.

2. The ceramic compact as claimed in claim 1, wherein the second component does not contain Ti element.

3. The ceramic compact as claimed in claim 1, wherein the first component contains Y$_2$O$_3$ as the Group IIIa element oxide in a proportion of 2.5 to 7.5 mol %.

4. The ceramic compact as claimed in claim 1, wherein the second component is a solid solution represented by the formula $$M(C_l N_m O_n)_z$$

wherein M is at least one member selected from the group consisting of Group IVa, Va and VIa elements of the Periodic Table, $l+m+n=1$, $l+m\neq 0$, $m+n\neq 0$, $l+n\neq 0$ and $1.2 > z > 0.5$.

* * * * *